UNITED STATES PATENT OFFICE.

PHILLIP ELEY, OF PHILADELPHIA, PENNSYLVANIA, ASSIGNOR TO HIMSELF AND R. B. FITTS, OF SAME PLACE.

IMPROVEMENT IN THE MANUFACTURE OF MANURE.

Specification forming part of Letters Patent No. 39,525, dated August 11, 1863.

*To all whom it may concern:*

Be it known that I, PHILLIP ELEY, of the city of Philadelphia, in the State of Pennsylvania, have invented a new and useful Process or Method of Treating Night-Soil for Agricultural Purposes; and I do hereby declare that the following is a full and exact description of the same.

The nature of my invention consists in the process or method hereinafter described of separating from night-soil the free water thereof, and also the phosphoric acid, ammonia, and other dissolved or gasified fertilizing substances, mixing the latter or the anhydrous substances with the moist insoluble portions, and finally desiccating and deodorizing the compound by means of anhydrous sulphate of lime and powdered charcoal into a pulverable and inodorous condition, thus reuniting all the constituents of night-soil that are really valuable to agriculturists into an inoffensive and merchantable article for use as a fertilizer of soils.

To enable others to understand and practice my invention, I will proceed to describe it and to suggest mechanical devices suitable for aiding in the operation or process.

In proceeding to carry out my invention I first pass the night-soil from the carts through screens into suitable tanks which are capable of being covered air-tight, and are provided with side linings of pounded charcoal or coke, and also drain-pipes leading from their bottoms to a lower reservoir in any suitable manner that will allow the urine or free water of the night-soil to filter through the said charcoal or coke and pass through the drain-pipes into the said lower reservoir.

The reservoir should be made water-tight, and also capable of being covered so as to be air-tight. The fluid from the tanks first mentioned is allowed to ferment in the reservoir, heat being applied in any suitable manner if necessary to expedite the decomposition which may be desirable, after which the fluid is pumped up or otherwise transferred into suitable tanks, and the phosphoric acid and ammonia in solution therein then precipitated by means of a solution of sulphate or muriate of magnesia or other chemicals which may be appropriate to the purpose of throwing down the saline acid and organic matters contained in the urine or fluid.

The quantities of the precipitating solutions will be governed by the condition of the fluid, its degree of fermentation, &c., and can be readily determined beforehand by testing a small quantity.

After the precipitates have subsided the clear water is run off to waste as exhausted and useless, and the precipitates remaining in the tanks will be a double phosphate of ammonia and magnesia with the organic and other matters which may have been suspended or held in solution in the fluid. This precipitated matter may be dried by absorbents and used as a powerful fertilizer, if so dried; but my intention is that it be removed to any suitable mixing-mill, and incorporated with a portion of the solid contents of the night-soil which were retained in the filtering-tanks.

The upper ends of the filtering-tanks, and also the upper end of the reservoirs, should connect by pipes with a close absorbing-chamber of any suitable size and form, provided with numerous shelves or platforms. Upon each of these shelves or platforms is spread a layer of a mixture consisting of pulverized sulphate of lime and charcoal, so that the ammonical and other gases which are eliminated by the contents of the close tanks and the reservoir and conducted into this chamber by the pipes aforesaid will be absorbed or taken up into combination therewith. When saturated the layers are to be removed from the chamber and a fresh supply substituted.

The removed portions may be used as a powerful fertilizer if, so desired; but it is my intention that they be mixed, like the precipitates from the urine, with a portion of the solids from the filtering-tanks. The whole of the contents remaining in the filtering-tanks is now to be mixed thoroughly with the dried products previously taken from the precipitating-tanks and the absorbing-chamber, which together will form a stiff mass, nearly free from moisture, and the whole incorpoated together with a sufficient quantity of anhydrous sulphate of lime to bring it into a perfectly-desiccated state. This part of the process will be best accomplished by passing the compound through a mixing-mill, and after the mixture has solidified or become cemented, as it probably will, again passing it through the mill. The product will contain all the valuable fertilizing substances of the original night-soil of the carts, and will be a compound unequaled in value as a fertilizer for agricultural purposes. It will also be well adapted for being packed in barrels or boxes for storage or shipment, and will not be liable to deterioration, nor to the production of offensive effluvia in any climate or temperature.

I do not desire to claim any part of the apparatus herein referred to in explaining my process or method of treating night-soil; but, Having fully described my invention, and thus pointed out what I believe to be the best means of carrying it out, what I claim as new, and desire to secure by Letters Patent, is—

The process or method herein described of treating night-soil for agricultural purposes.

PHILLIP ELEY.

Witnesses:
BENJ. MORISON,
WILLIAMS OGLE.